United States Patent
Bhattacharya et al.

(10) Patent No.: US 8,346,772 B2
(45) Date of Patent: Jan. 1, 2013

(54) SYSTEMS AND METHODS FOR INTERACTIVE CLUSTERING

(75) Inventors: Indrajit Bhattacharya, Bangalore (IN); Kumar Avinava Dubey, Kolkata (IN); Shantanu Ravindra Godbole, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 12/883,401

(22) Filed: Sep. 16, 2010

(65) Prior Publication Data

US 2012/0072421 A1    Mar. 22, 2012

(51) Int. Cl.
  *G06F 7/00*    (2006.01)
  *G06F 17/30*   (2006.01)
(52) U.S. Cl. .......... 707/737; 707/794; 714/750; 706/19
(58) Field of Classification Search .......... 707/737, 707/792, 805, 809, E17.046, E17.047, E17.64, 707/E17.089, E17.091, E17.092, 794; 714/750; 706/19
See application file for complete search history.

(56) References Cited

U.S. PATENT DOCUMENTS

| | | | |
|---|---|---|---|
| 6,269,368 B1 * | 7/2001 | Diamond | 707/999.003 |
| 6,560,597 B1 | 5/2003 | Dhillon et al. | |
| 6,675,159 B1 | 1/2004 | Lin et al. | |
| 7,092,936 B1 | 8/2006 | Alonso et al. | |
| 7,185,001 B1 * | 2/2007 | Burdick et al. | 707/999.003 |
| 7,617,193 B2 | 11/2009 | Bitan et al. | |
| 7,707,171 B2 | 4/2010 | Willcock | |
| 8,036,135 B2 * | 10/2011 | Stamoulis | 370/252 |
| 8,099,279 B2 * | 1/2012 | Acero et al. | 704/251 |
| 2002/0091976 A1 * | 7/2002 | Lee | 714/712 |
| 2003/0023600 A1 * | 1/2003 | Nagamura et al. | 707/10 |
| 2003/0110181 A1 * | 6/2003 | Schuetze et al. | 707/103 R |
| 2006/0242140 A1 | 10/2006 | Wnek | |
| 2007/0050388 A1 * | 3/2007 | Martin | 707/101 |
| 2008/0104063 A1 | 5/2008 | Gallivan et al. | |
| 2008/0270478 A1 * | 10/2008 | Liu et al. | 707/104.1 |
| 2009/0043797 A1 | 2/2009 | Dorie et al. | |
| 2009/0182694 A1 * | 7/2009 | Boulatsel et al. | 706/19 |
| 2009/0287668 A1 * | 11/2009 | Evans et al. | 707/4 |
| 2009/0292965 A1 * | 11/2009 | Park et al. | 714/750 |

(Continued)

FOREIGN PATENT DOCUMENTS

WO    WO 0233508    4/2002

OTHER PUBLICATIONS

Chee-Yong Chan, Minos Garofalakis and Rajeev Rastogi—"REtree: an efficient index structure for regular expressions"—Proceedings of the 28th VLDB Conference, Hong Kong, China, 2002—(pp. 1-12).*

(Continued)

*Primary Examiner* — Anh Ly
(74) *Attorney, Agent, or Firm* — Ference & Associates LLC

(57) ABSTRACT

Systems and associated methods provide a cluster-level semi-supervision model for inter-active clustering. Embodiments accept user provided semi-supervision for updating cluster descriptions and assignment of data items to clusters. Assignment feedback re-assigns data items among existing clusters, while cluster description feedback helps to position existing cluster centers more meaningfully. The feedback can continue until the user is satisfied with the clustering achieved or one or more predetermined stopping criteria have been reached.

18 Claims, 11 Drawing Sheets

U.S. PATENT DOCUMENTS

2010/0005093 A1 1/2010 Heumann
2011/0225541 A1* 9/2011 Ramos ................. 715/790

OTHER PUBLICATIONS

Wang Lian, David W. Cheung, S.M. Yiu—"An Efficient Algorithm for Finding Dense Regions for Mining Quantitative Association Rules"—Computers and Mathematms with Applicatmns 50 (Auguest, 2005) pp. 471-490—www elsevler.com/locate/camwa(Recewed Feb. 2004; accepted Mar. 2005).*

Kang, Bo-Yeong, et al., "Exploring concepts clusters for content-based information retrieval", Mar. 11, 2004, 20 pages, available online at www.sciencedirect.com, Elsevier Inc., Information Sciences, Amsterdam, The Netherlands.

Bekkerman, R., et al., "Interactive Clustering of Text Collections According to a User-Specified Criterion", IJCAI 2007, Proceedings of the 20th International Joint Conference on Artificial Intelligence, Jan. 6-12, 2007, pp. 684-689, Hyderabad, India.

Bar-Hillel, A. et al., "Learning Distance Functions using Equivalence Relations," Proceedings of the Twentieth International Conference on Machine Learning (ICML-2003), 2003, 8 pages, Wasington, DC, USA.

Basu, S. et al., "Active Semi-Supervision for Pairwise Constrained Clustering," Proceedings of the SIAM International Conference on Data Mining, (SDM-2004), Apr. 2004, pp. 333-344, Lake Buena Vista, Florida, USA.

Basu, S. et al., "Semi-supervised Clustering by Seeding," Proceedings of the 19 th International Conference on Machine Learning, (ICML-2002), Jul. 2002, pp. 19-26, Sydney, Australia.

Cohn, D. et al., "Semi-supervised Clustering with User Feedback," Technical Report, TR2003-1892, 2003, 9 pages, Cornell University, Ithaca, New York. can be found at http://techreports.library.cornell.edu:8081/Dienst/UI/1.0/Display/cul-cis/TR2003-1892 as of Jun. 25, 2012.

Cohn, D. et al., "Improving Generalization with Active Learning," Machine Learning, 1994, pp. 201-221, vol. 15, Kluwer Academic Publishers, Boston, Massachusetts, USA.

Cohn, D. et al., "Active Learning with Statistical Models," Journal of Artificial Intelligence Research, 1996, pp. 129-145, vol. 4, Al Access Foundation and Morgan Kaufmann Publishers.

Davidson, Ian, et al., "Identifying and Generating Easy Sets of Constraints For Clustering," American Association for Artificial Intelligence, 2006, pp. 336-341.

Dhillon, I. S., et al., "Information-Theoretic Co-clustering," SIGKDD '03, Aug. 24-27, 2003, 10 pages, ACM, Washington, DC, USA.

Wagstaff, Kiri et al., "Clustering with Instance-level Constraints," Proceedings of the Seventeenth International Conference on Machine Learning, 2000, pp. 1103-1110.

Wagstaff, Kiri et al., "Contrained K-means Clustering with Background Knowledge," Proceedings of the Eighteenth International Conference on Machine Learning, 2001, pp. 557-584.

Davidson, Ian et al., "Intractability and Clustering with Constraints," Proceedings of the 24th International Conference on Machine Learning, 2007, 8 pages.

* cited by examiner

Interactive Cluster Process

Params: Data point set $X$, Int $k$

1. Initialize $F^a$ and $F^d$ to empty set
2. % Initialize clusters
3. Initialize $k$ clusters in $C$
4. Iterate $n$ times or until convergence
5.     Assign each data point in $X$ to nearest cluster
6.     Recompute $k$ clusters from assigned data points
7. % Start inter-active k-means
8. Iterate until user is satisfied with $C$
9.     Acquire new feedback and add to $F^a$ and $F^d$
10.     Iterate $n$ times or until convergence
11.         Iteratively update each of $k$ clusters in $C$
     based on relevance $F^a$, $F^d$, and assignment $\delta$
12.     Re-calculate relevance $F^a$, $F^d$, based on updated clusters $C$
13.     Re-calculate assignment of data points in $X$
     based on updated clusters $C$ and relevance $F^a$
14. Return $k$ clusters $C$ and assignment $\delta$

FIG. 3

SYSTEMS AND METHODS FOR INTERACTIVE CLUSTERING

BACKGROUND

While clustering has been one of the most effective tools for exploratory data mining for decades, it is widely accepted that the clusters generated without any supervision often do not lead to meaningful insights for the user. Accordingly, there has been a lot of interest in developing semi-supervised clustering models that can accommodate supervision from the user to guide the clustering process. In the most popular model for semi-supervised clustering, the user provides must-link and cannot-link constraints over pairs of data instances. It has been shown that such constraints can significantly improve clustering performance beyond that of unsupervised models.

BRIEF SUMMARY

The subject matter described herein generally relates to systems and associated method providing a cluster-level semi-supervision model for inter-active clustering. Embodiments accept user provided semi-supervision for updating cluster descriptions and assignment of data items to clusters. Assignment feedback re-assigns data items among existing clusters, while cluster description feedback helps to position existing cluster centers more meaningfully.

In summary, one aspect provides a computer program product for interactive clustering comprising: a computer readable storage medium having computer readable program code embodied therewith, the computer readable program code comprising: computer readable program code configured to access a collection of items to be clustered; computer readable program code configured to cluster the collection of items to be clustered into an initial plurality of clusters; computer readable program code configured to access user input feedback modifying one or more of cluster assignment of the initial plurality of clusters and cluster description of the initial plurality of clusters; and computer readable program code configured to re-cluster the collection of items based on the user input feedback.

Another aspect provides a method for interactive clustering comprising: accessing a collection of items to be clustered; clustering the collection of items to be clustered into an initial plurality of clusters; accessing user input feedback modifying one or more of cluster assignment of the initial plurality of clusters and cluster description of the initial plurality of clusters; and re-clustering the collection of items based on the user input feedback.

A further aspect provides a system for interactive clustering comprising: one or more processors; and a memory operatively connected to the one or more processors; wherein, responsive to execution of computer readable program code accessible to the one or more processors, the one or more processors are configured to: access a collection of items to be clustered; cluster the collection of items to be clustered into an initial plurality of clusters; access user input feedback modifying one or more of cluster assignment of the initial plurality of clusters and cluster description of the initial plurality of clusters; and re-cluster the collection of items based on the user input feedback.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates example interactive clustering process steps.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

The description now turns to the figures. The illustrated example embodiments will be best understood by reference to the figures. The following description is intended only by way of example and simply illustrates certain example embodiments representative of the invention, as claimed.

Figure 1B:
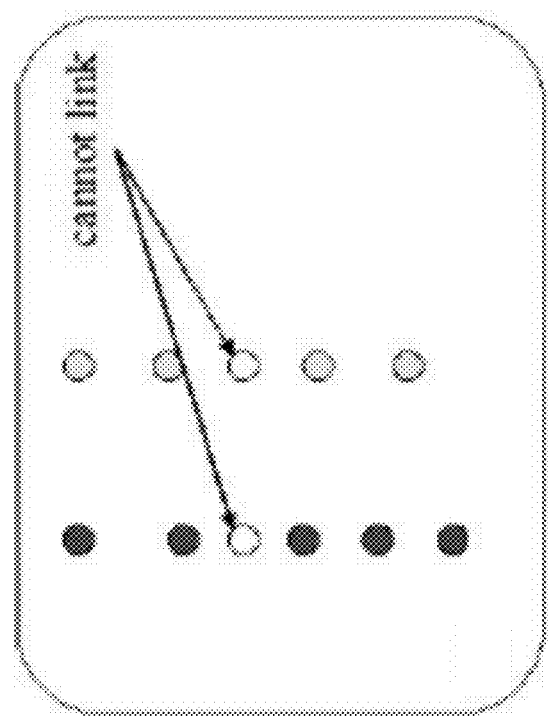
FIG. 1(A-B) illustrates example dataset characteristics.
Figure 1A:
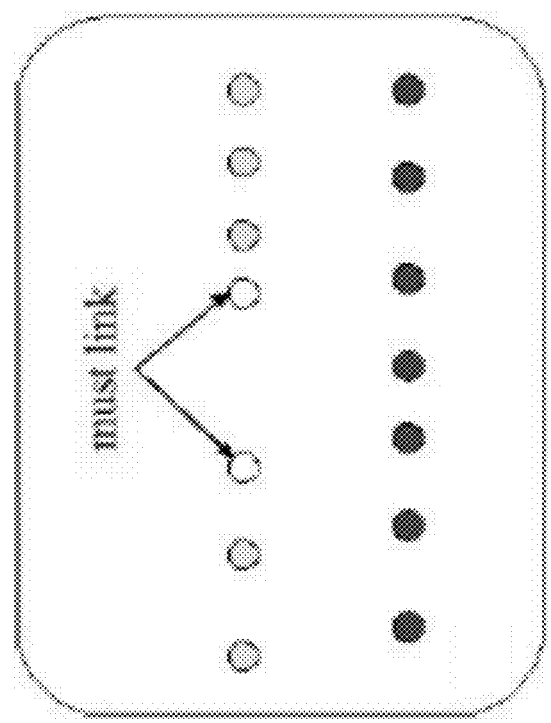

As above, supervised (or semi-supervised) clustering shows promise for improving clustering results. An interesting feature of an instance-level model is that the constraints are independent of each other, and also of all other instances in the dataset. However, it is straightforward to imagine example datasets, as in FIG. 1(A-B), where the same pair of instances may be 'must-linked' (FIG. 1A) or 'cannot-linked' (FIG. 1B), depending on the other instances present in the dataset. Therefore, such independent constraints required by the instance-level model can only be provided when a supervisor (user) can visualize the space of all the data instances and then decide on the desired shape of the clusters, as in most illustrative examples for instance-level supervision.

However, such visualization of data items is difficult, if not impossible, in high dimensions, for example when clustering a collection of text documents. Consider for example a pair of documents, one on the English soccer league and the other on the Spanish soccer league. These documents might belong to the same cluster if the document collection is on different types of sports, but not be in the same cluster if the collection of documents discusses different European soccer leagues. Thus providing constraints on this pair of documents is not possible using independent pair-wise constraints without visualizing or understanding the document collection in its entirety.

Accordingly, as an alternative, embodiments enable an interactive cluster-level semi-supervision framework for clustering, where such conditional constraints can be provided by a human supervisor. Prototype or model based clustering algorithms typically iterate over two steps. The two steps are assignment of data points to clusters and adjustment of clusters to minimize distortion.

According to embodiments, the user provides two different types of feedback aimed directly at supervising these two different steps, while the clustering process executes. Using assignment feedback, the user moves a data point from one of the current clusters to another. Using cluster description feedback, the user modifies the feature vector of any current cluster to make it more meaningful. Such an interactive framework is particularly useful for exploring large, high-dimensional data sets when the clusters are not known in advance.

The current set of clusters provides the user with a summarized, aggregated view of the entire dataset. Conditioned on this current set of clusters, and also enabled by the summary that it provides, the user then re-assigns and re-adjusts this clustering as the user deems appropriate. The clustering process learns from this feedback, and from other feedback provided in earlier stages, to re-cluster the dataset, which the user can again inspect and critique. The iterative process continues until the user is satisfied with the clustering.

Figure 2:
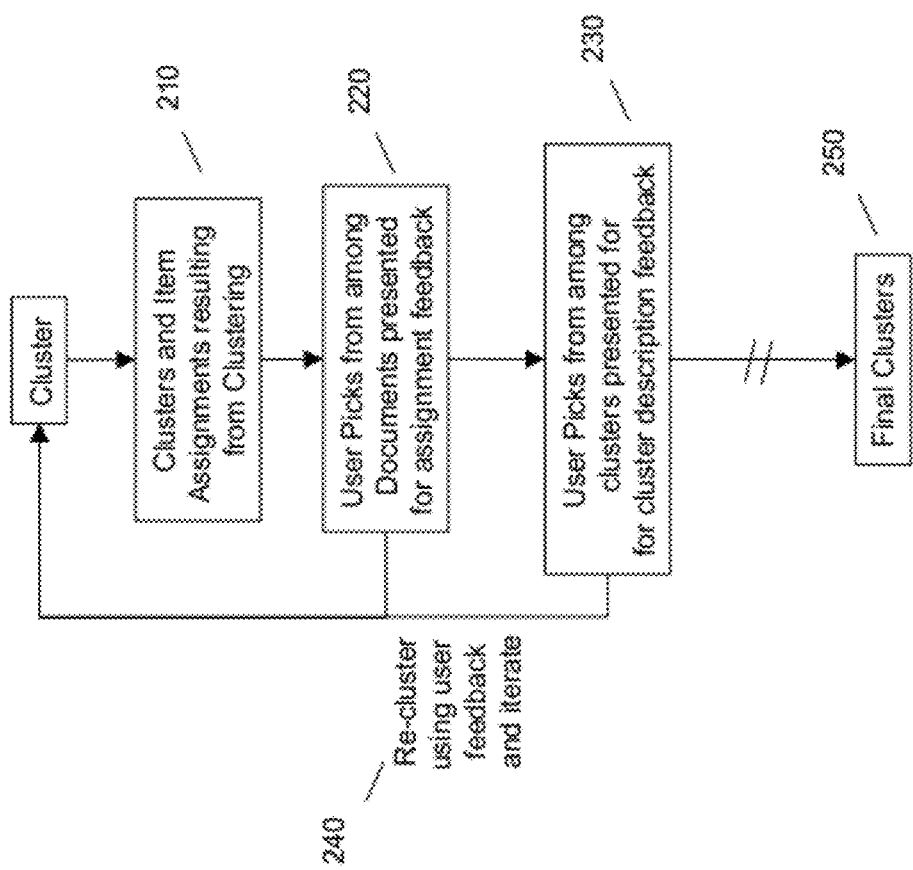
FIG. 2 illustrates an example method for interactive clustering.
Figure 4A:
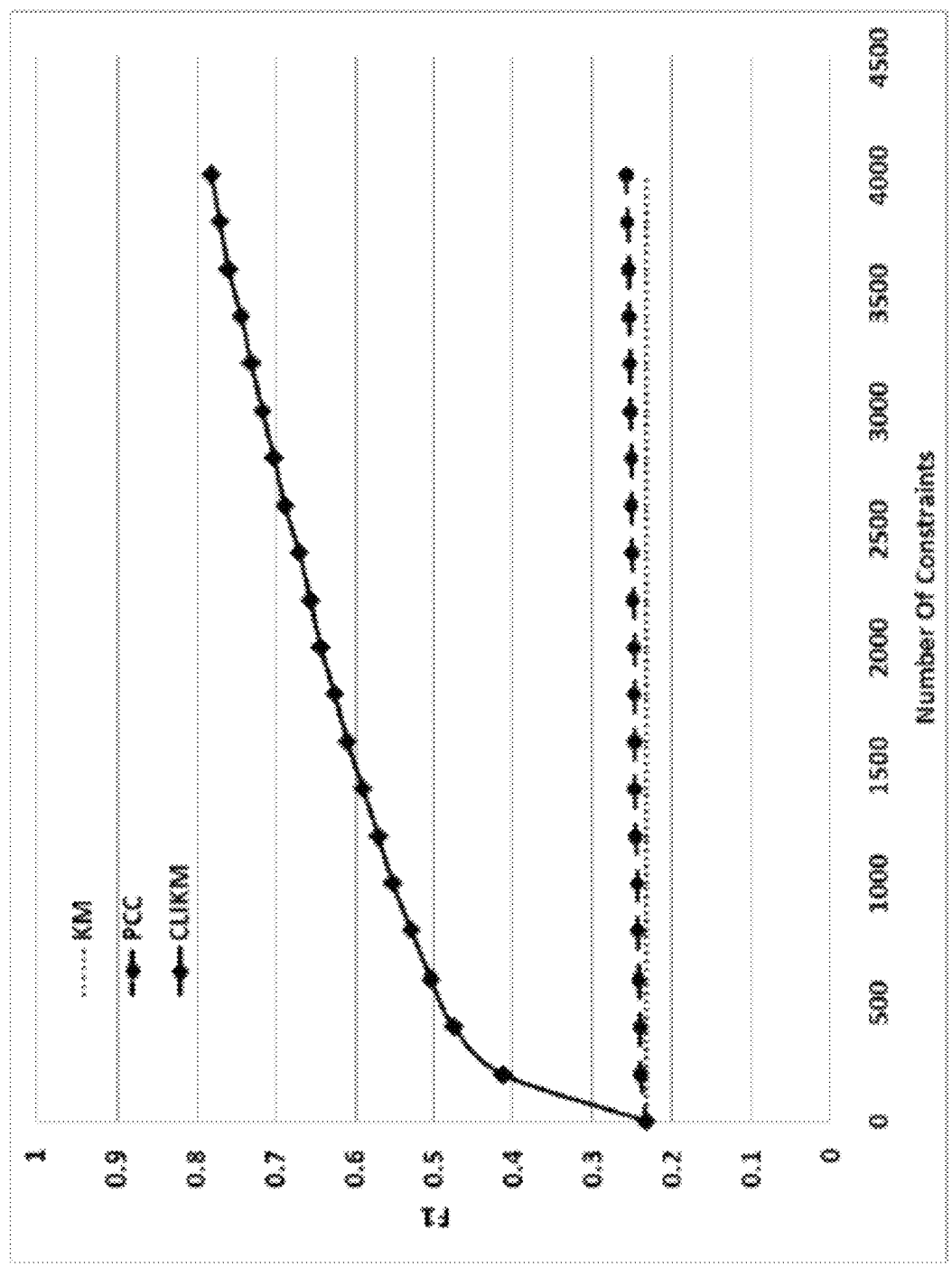
FIG. 4(A-D) illustrates performance evaluation examples for several clustering approaches operating on collections of documents.
Figure 4B:
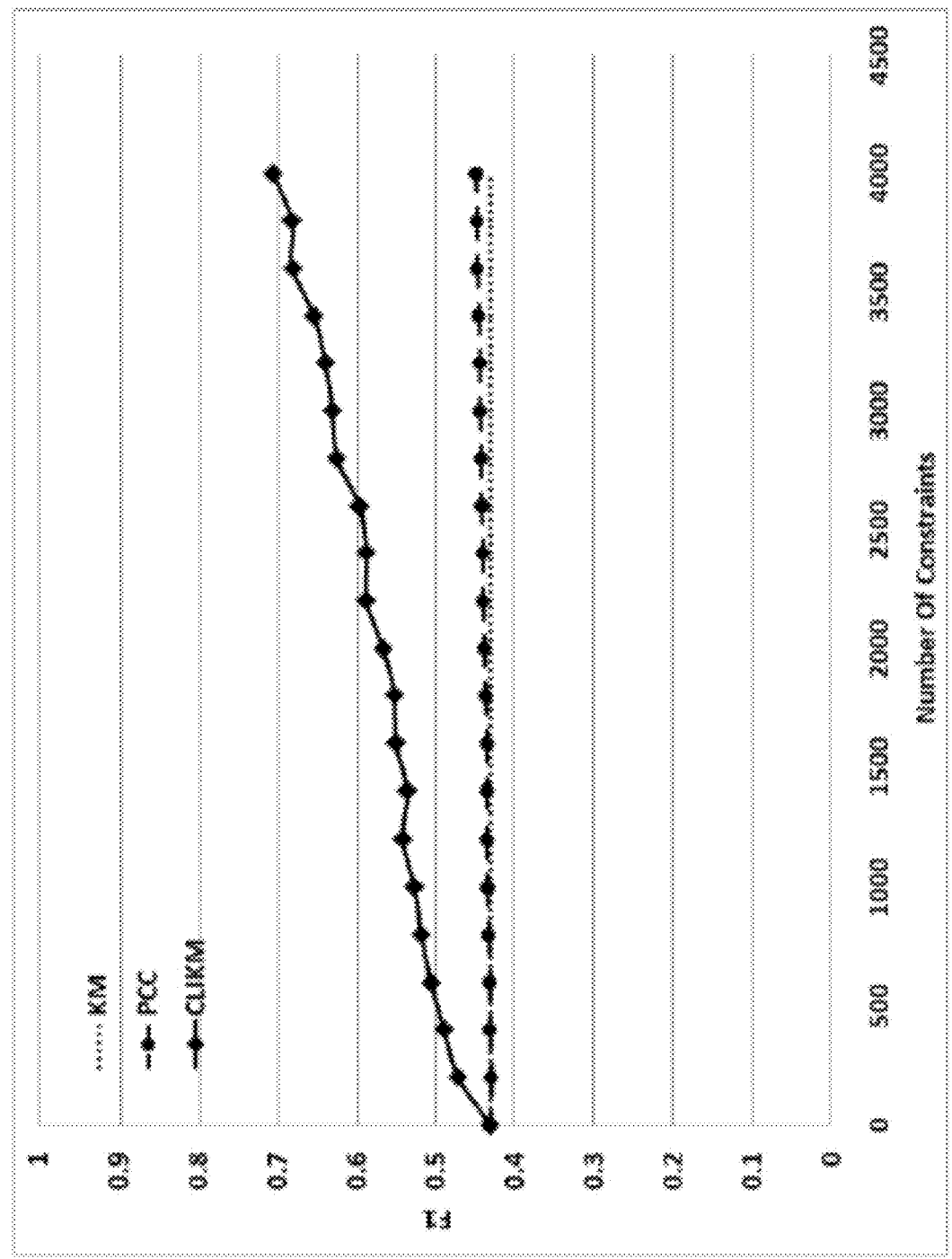
Figure 4C:
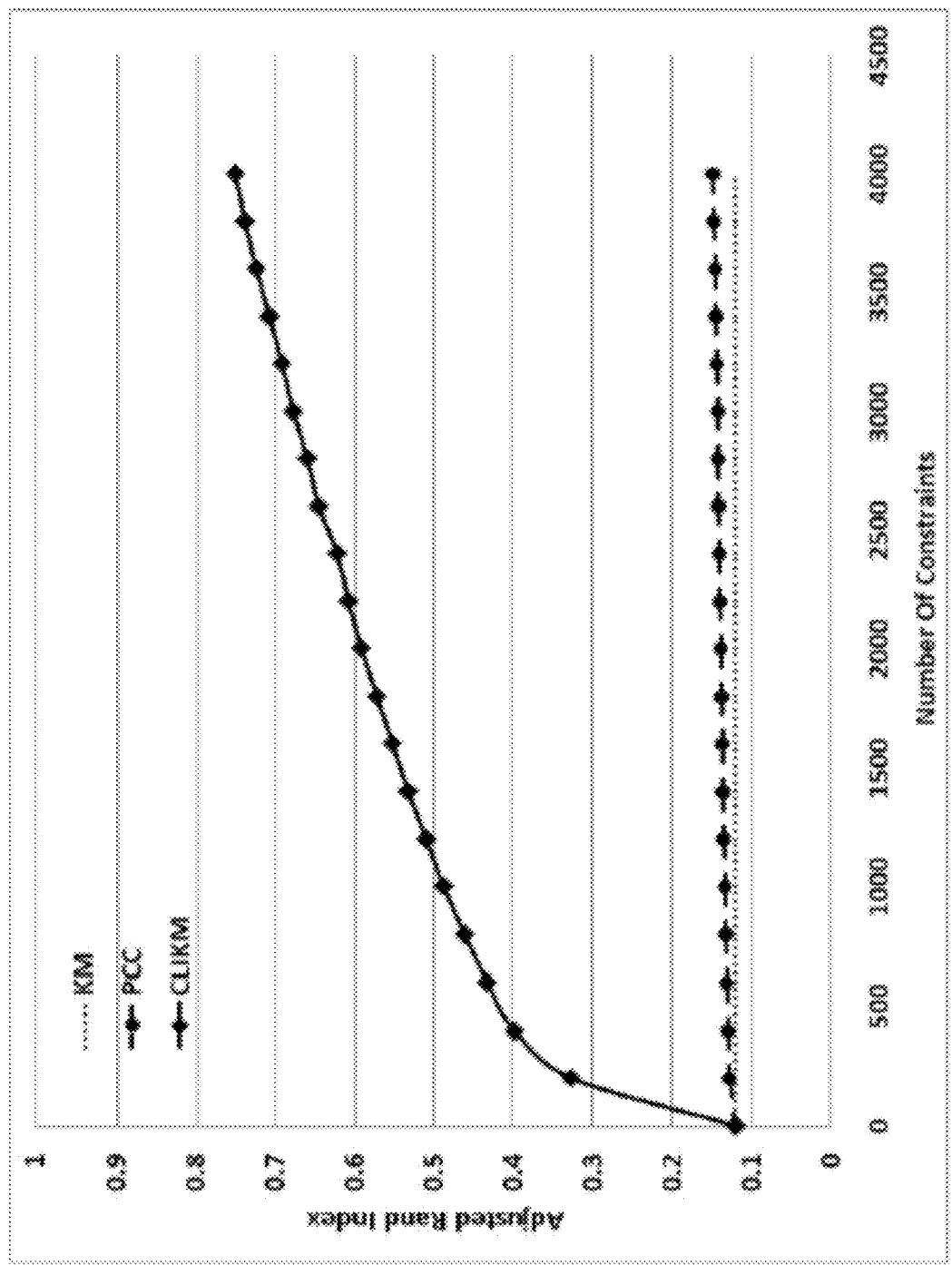
Figure 4D:
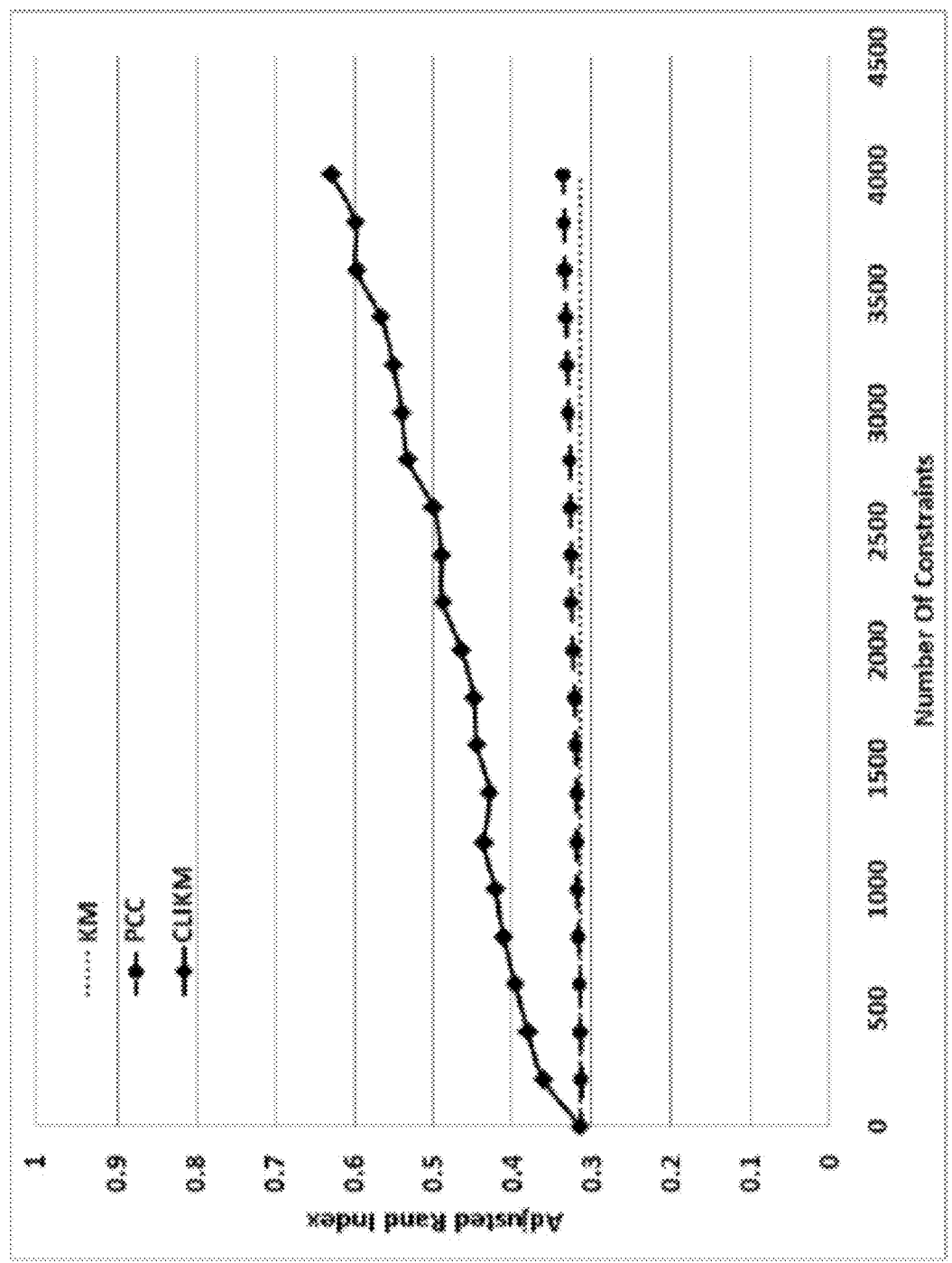

Referring to FIG. 2, an example method for interactive clustering is illustrated. A clustering process is run 210 to form initial clusters. The clustering process can be any of a variety of clustering processes, for example, k-means. At step 220, the user is able to review the results of the initial clustering 210. The system presents k objects along with cluster assignments for cluster-assignment feedback. For cluster-assignment feedback 220, a user can indicate that one or more clustered objects is/are incorrectly assigned to a cluster by the initial clustering process 210, and provide a proper assignment (assignment feedback 220) for the one or more clustered objects. Moreover, the system presents m clusters for cluster description feedback 230. For cluster description feedback 230, the user can re-shape one or more clusters, for example by modifying one or more words used to describe the cluster. This clustering and feedback processing can be iterated 240 as desired until the user is satisfied with the final clusters 250 produced.

The following description provides several specific examples of an interactive clustering process according to the embodiments. The examples used herein focus on assignment feedback and/or cluster description feedback interpreted as constraints, incorporated within the k-means (objective function clustering) formulation for clustering documents. The assignment and update steps can be modified to minimize constraint violation while maintaining low distortion error. This is by no means limiting, however, as the embodiments are equally applicable to use with other clustering processes applied to other objects to be clustered.

Cluster-level Supervision: An Example

As an illustrative example of cluster-level supervision, clustering of document collections is utilized. However, as above, the framework also offers similar advantages for other high dimensional domains.

Consider a very large collection of postings on a vehicle-related mailing list. Suppose an analyst wishes to understand the issues being discussed, and, in order to do so, decides to partition the posts into k clusters, using the first stage of the process 210, which is completely unsupervised. Note that the analyst does not have any idea of possible issues ahead of time, apart from that the possible issues all relate to vehicles. On inspecting the cluster descriptions, that is, the top words in decreasing order of weight (or importance) for the cluster, the analyst may find that one cluster ($c_1$) is about {"bike manufacturer 1", "car and bike manufacturer 1", car, bike, "car manufacturer 1"}, while another ($c_2$) is about {parts, power-steering, door, power-windows}. Using domain knowledge, the analyst understands that the $c_1$ is about Bikes & Cars, while $c_2$ is about Car Parts.

In a first example scenario, the analyst likes these cluster descriptions, and goes on to inspect some of the individual posts contained in them. The analyst notices that some posts truly relating to $c_1$ (Bikes & Cars) (in the analyst's opinion, for example a few mentioning 'the best part about "car and bike manufacturer 1"' have been assigned incorrectly by the initial clustering process 210 to the Car Parts cluster $c_2$. The analyst corrects this by appropriately re-assigning these posts to $c_1$. This is referred to herein as an assignment feedback 220 from the user, where he moves a data instance from one existing cluster to another. The clustering process learns from this feedback. That is, to add 'part' to the description of the first cluster $c_1$ as well, possibly with a small weight, so that other similar posts get correctly assigned.

In a second example scenario, the analyst decides that he or she would rather cluster $c_1$ to be about Bikes and cluster $c_2$ to be about Cars & Car Parts. To achieve this, the analyst adjusts the description of the clusters, by changing $c_1$'s description to {bike manufacturer 1, car and bike manufacturer 1, bike} and $c_2$'s description to {car, care manufacturer 1, power-steering, door, power-windows, car and bike manufacturer 1}. This is referred to herein as a cluster description feedback 230, where the analyst directly modifies the features in the cluster description according to his or her preference.

Observe that it would not have been possible for the analyst to create these new cluster descriptions without knowing the summaries provided by the existing cluster descriptions (a result of the initial clustering process 210). Again, the process learns from this cluster description feedback to correctly reassign the posts to appropriate clusters. Assume for the purposes of description that the analyst provides a new weight vector for the cluster description, but in practice the analyst need not specify weights explicitly. For example, in a working system, the analyst may simply rank order the top few features, or click and drag a weight curve over them. Thus, the details of the user interface are configurable to accommodate a variety of possibilities.

In general, the user is expected to provide both these types of feedback to the process inter-actively as new clusters emerge and documents get assigned to them. At any stage, the process considers all feedback provided so far, even those at earlier stages, to re-cluster the documents.

It should be noted that it is possible to provide cluster description feedback indirectly through assignment feedback, and vice versa. Re-assignment of points to centroids will automatically result from cluster description changes. Similarly, many assignment constraints will lead to movement of the centroid in the next iteration. However, using the feedback types directly to achieve the intended effect saves the user considerable time and effort.

Problem Formulation

In the traditional k-means problem, there are a set of n data points $\{x_1, \ldots, x_n\}$, each drawn from domain X. A clustering of these data points is defined by k clusters $\{c_1, \ldots, c_k\}$ with corresponding centers $\{\mu_1, \ldots \mu_k\}$, and an assignment $\delta(c_i, x_j)$ of data points to clusters. Each data point and the cluster center to be defined is considered as weighted vectors over the features of X. Given such a clustering C, one can measure the distortion error for C as the summed distance of data points from their corresponding cluster centers:

$$E^x(C, \delta) = \sum_i \sum_j (\mu_i - x_j)^2 \delta(\mu_i, x_j) \quad (1)$$

Typically, given the set of data points, the goal of k-means clustering is to find the k cluster centers and an assignment of data points to clusters such that the total distortion error is minimized. In the rest of the formulation, there will be no distinction made between clusters and centers. For example, the notation $\mu$ is used to refer to both a center and its corresponding cluster. Moreover, in this example problem formulation, two different types of feedback are provided by the user.

A set $F^a$ of l assignment feedback iterations are provided by the user, possibly over different stages of the inter-active procedure. The $i^{th}$ assignment feedback $f_i^a$ can be represented as $\{x_i^a, \mu_i^a, \mu_i^a\}$, indicating that data point $x_i^a$ is assigned by the user to a specific cluster $\mu_i^a$ from the set of current clusters $\mu_i^a$.

A set $F^d$ of m cluster description feedback iterations are also provided by the user, again possibly over various stages of the inter-active process. For the $i^{th}$ such feedback $f_i^d$, one can assume that the user observes the top t features of a cluster ordered by weight ($o_i^d$) and provides his or her preferred feature vector ($p_i^d$) for it as feedback. The observed description length for cluster description feedback is called t. Accordingly, $f_i^d$ is represented as $\{o_i^d, p_i^d\}$, where $o_i^d$ is an ordered set of features and $p_i^d$ is a weight vector over all features.

Though each feedback is provided at a specific stage of the interaction for a specific set of clusters C, it is desirable to make use of it at later stages when the current set of clusters is C', depending on how different C' is from C. Therefore, at any stage of the clustering, all feedback that has been provided up to that stage is considered.

In the presence of these two sets of feedback from the user, a reformulated clustering goal is to conform to this feedback as much as possible, while still maintaining low distortion error. In order to capture this in our objective function, one constraint is associated for each feedback and a penalty that the clustering penalty has to pay for violating that constraint.

First consider an assignment feedback $f_i^a$. The most specific constraint that arises from it is that every time the current set of clusters exactly matches $\mu_i^a$, the data point $x_i^a$ always has to be assigned to the specific cluster $\mu_i^a$ from among them. The penalty for violating this constraint is the distance between $\mu_i^a$ and the cluster $\delta(x_i^a)$ to which is assigned instead. (Note that, without ambiguity, the symbol $\delta$ has been overloaded to use $\delta(x_i^a)$ as a function that returns a specific cluster.)

However, this very specific interpretation would render this constraint irrelevant at later stages of the clustering when the current set of clusters is even slightly different from $\mu_i^a$. To get around this, the relevance $R_i^a(C)$ of an assignment constraint $f_i^a$ is defined, given a current set of clusters C, as the 'similarity' of C with the set of clusters $\mu_i^a$ specified in the feedback. For a 'similar' set of clusters C, there is no penalty when is assigned to the cluster $N_i^a(C)$ that is 'nearest' to $\mu_i^a$ in the current cluster set C. If, however, $x_i^a$ is assigned to some cluster $\delta(x_i^a)$ which is different from $N_i^a(C)$, then the clustering process has to pay a penalty equal to the distance between $\delta(x_i^a)$ and $N_i^a(C)$. The total assignment error takes into account both the penalty and the current relevance of the constraint. The higher the relevance, the higher is the assignment error for violating the constraint.

In summary, the clustering error associated with an assignment feedback $f_i^a$ is captured as:

$$E_i^a(C, \delta) = (\delta(x_i^a) - N_i^a(C))^2 \times R_i^a(C) \quad (2)$$

The total error for the entire set of assignment feedback $F^a$ is obtained by summing over the errors for the individual feedback: $E^a(C, \delta) = \sum_{i=1}^{l} E_i^a(C, \delta)$.

The relevance of the current set of clusters C to the feedback clusters $\mu_i^a$ is measured using the best mapping $M_i^a(C)$ between the two sets of clusters. The weakness of such a mapping can be measured by the summed distances between mapped clusters from the two sets. The relevance is then defined using an exponential function as:

$$R_i^a(C) = \exp\left(-\left(\sum_{\mu \in C}(\mu - M_i^a(\mu))^2\right)\right) \quad (3)$$

Now consider a cluster description feedback $f_i^d \in F^d$. The most specific constraint that can be associated with $f_i^d$ is that for any cluster $\mu$ from the current set of clusters C, if the observed description of $\mu$ is the same as the description $o_i^d$ in the feedback, then the center $\mu$ of the cluster should match the user preferred weight vector $p_i^d$. Recall that the observed description is the ordered set top (u,t) of top t features of $\mu$. In case the current and preferred weight vectors ($\mu$ and $p_i^d$) over features do not match, the clustering process has to pay a penalty equal to the distance between the two weight vectors.

As for the assignment feedback, the specificity of this interpretation would make $f_i^d$ irrelevant for most clusters at later stages, where the top feature sequence top ($\mu$, t) does not exactly match $o_i^d$. This is dealt with as before by introducing a relevance measure $R_i^d(\mu)$ for each cluster description feedback $f_i^d$ and any cluster $\mu$. The higher the relevance of the feedback for any cluster, the higher is the description error for not conforming with it. The relevance $R_i^d(\mu)$ of a description feedback may be measured using various similarity measures defined for ordered sets:

$$R_i^d(\mu) = \text{RankSim}(\text{top}(\mu,t), o_i^d) \quad (4)$$

For simplicity, RankSim($s_1, s_2$) is presently defined to be 1 if the unordered sets corresponding to $s_1$ and $s_2$ match, and 0 otherwise. Other measures that reward subset matches, such as Jaccard Similarity, may be utilized.

In summary, the clustering error associated with each cluster description feedback $f_i^d$ is given as:

$$E_i^d(C, \delta) = \lambda_i \sum_{\mu \in C} (\mu - p_i^d)^2 \times R_i^d(\mu) \quad (5)$$

where $\lambda_I$ is the strength of the $i^{th}$ cluster description feedback. To appreciate the use of $\lambda_I$, observe that for assignment feedback, the process can typically satisfy the user by assigning the feedback point to the user specified cluster. However, for description feedback, the points currently assigned to a cluster also affect the position of its new center in conjunction with the user-specified description. $\lambda_I$ is used to specify the relative importance of the user's feedback and the assigned points. Some further elaborate on the role of $\lambda_I$ is provided herein.

The total error for the entire set of cluster description feedbacks $F^d$ is obtained by summing over the errors for the individual feedbacks:

$$E^d(C,\delta) = \Sigma_{i=1}^m E_i^d(C,\delta).$$

Finally, the total clustering error is the sum of the errors due to distortion, assignment constraints and cluster description constraints:

$$E(C,\delta) = E^x(C,\delta) + E^a(C,\delta) + E^d(C,\delta) \quad (6)$$

A goal then is to find the optimal combination of clusters and assignments that minimize this total error.

Interactive Clustering Process

Embodiments provide a clustering process that iteratively alternates between interacting with the user to acquire feedback and minimizing the total error in Equation (6) considering all the feedback obtained from the user so far over all stages. Processes for proto-type or model-based clustering typically follow an iterative alternating optimization style, where each step consists of two sub-steps: prototype update; and, re-assignment. The description now turns to how these two steps can be modified to handle user feedback. The user interacts with the clustering process to provide feedback.

Cluster Update: In the cluster update sub-step, the existing clusters C are updated based on the current assignment $\delta$ of data points to clusters, and the current relevance $R^a(C)$ and $R^d(C)$ of the feedback types $F^a$ and $F^d$. Unfortunately, the different clusters cannot be updated independently as for the traditional k-means approach. This is because the feedback introduces dependencies across clusters. As a result, embodiments update each of the k clusters keeping the other k−1 clusters fixed. This procedure is repeated until all the clusters stabilize. When the other k−1 clusters are held fixed, along with the assignments and the feedback relevancies, updating cluster $\mu_i$ to minimize total error becomes a quadratic optimization problem. Solving it leads to the following update step:

$$\mu = \frac{1}{Z} \times \sum_x x\delta(x, \mu) + \sum_{i=1}^l R_i^a(C) \left[ \delta(x_i^a, \mu) N_i^a(C) + \sum_{\mu'} I(\mu', N_i^a(C)) \delta(x_i^a, \mu') \mu' \right] + \sum_{i=1}^m \lambda_i R_i^u(\mu) p_i^d$$

where I( ) is the indicator function, and Z is an appropriate normalization term.

The update rule may be interpreted as follows. The first term shows the traditional movement of the cluster towards the centroid of the data points currently assigned to it. The second and third terms demonstrate the dependence on the other current centers brought about by the assignment constraints. An assignment feedback $f_i^a$ is relevant for cluster $\mu$ either if the feedback data point $x_i^a$ is currently assigned to this cluster, or if $\mu$ is the currently preferred cluster $N_i^a(C)$ for feedback $f_i^a$. In the first case, the cluster $\mu$ moves towards that current cluster $N_i^a(C)$ which is the currently preferred cluster for the feedback $f_i^a$. This is reflected by the second term. In the other case, cluster $\mu$ tries to move closer to that cluster $\mu'$ to which the feedback point $x_i^a$ is currently assigned. This is reflected by the third term. Both of these movements are influenced by the current relevance $R_i^a(C)$ of the assignment feedback in question.

The effect of the cluster description feedback is captured by the last term. For any description feedback $f_i^d$ that is relevant for this cluster, the cluster moves closer to the preferred description $p_i^d$ in the feedback. As before, this movement is also tempered by the relevance $R_i^u(\mu)$ of the feedback for this cluster.

Finally, the updated position of the cluster is the net effect of the influence of all the relevant assignment and description constraints, as well as all of the data points currently assigned to this cluster. Observe that in the update rule, the user preferred description $p_i^d$ for a description feedback behaves similarly to any other data point assigned to the cluster, and would have minimal effect in determining its new position without the weighting term $\lambda_I$.

Once all of the k clusters have been iteratively updated and have stabilized, the relevance $R^a$ and $R^d$ of the assignment and description constraints is recalculated based on the updated cluster positions, according to Equation (3) and Equation (4) respectively.

Point Reassignment: In the re-assignment step, the assignment $\delta$ of the data points is recalculated based on the updated cluster positions and the current relevance of the constraints. The contribution to clustering error by assigning a data point x to an existing cluster $\mu$ can be calculated by considering the distance from the cluster, and, for any assignment feedback $f_i^a$ specified on the point x, the distance of $\mu$ from the currently preferred cluster $N_i^a(C)$ for the feedback, and its current relevance $R_i^a(C)$:

$$(\mu - x)^2 + \sum_{i=1}^l R_i^a(C) I(x, x_i^a) (\mu - N_i^a(C))^2$$

where I( ) is again the indicator function. The point is then assigned to that cluster $\mu$ among the k current clusters for which this assignment error is minimized. Observe that cluster description feedback do not influence the assignment of data points. Also observe that, unlike cluster updates, the reassignment of each data point can still be done independently of the other data points, as in the traditional k-means approach.

User Interaction: At each stage, after minimizing total error in Equation (6) considering all the feedback obtained so far, the process returns the new set of clusters for inspection. The user browses over the new cluster descriptions and assignments and provides fresh feedback on them. While it may be possible for the user to inspect all cluster descriptions, or at least the ones that have changed significantly since his previous inspection, it is extremely unlikely that he or she can inspect cluster assignments of all data items.

It can be assumed that the user can provide only $n_f = n_a + n_d$ feedback at each interaction stage, where $n_a$ is the number of assignment feedback and $n_d$ is the number of description feedback. It can also be assumed that $n_d = k$, which means the user inspects all clusters, but $n_a \ll n$, where n is the number of data points. It can also be assumed that the user randomly selects $n_a$ data points for inspecting and providing feedback. However, it is possible to do better than this, as in the case of active learning. Thus, the data points for presenting to the user for feedback can be actively selected.

The overall example cluster-level interactive k-means process (CLIKM) is shown in FIG. 3. The algorithm starts by creating an initial set of clusters in steps 2-5, based only on distortion error. Then at every step, the process updates the clusters (step 9), recalculates the relevance of all feedback (step 10) and then re-assigns the data points based on the updated clusters and the relevance of the all constraints acquired so far (step 11). These 10 steps are repeated until convergence based on the current set of feedback. The process terminates when the user is satisfied with the current clustering. Otherwise, the process acquires more feedback from the user (step 7) and re-clusters the data points based on the feedback set, which now additionally includes the most recently received feedback.

A Supervisor Model

Large-scale evaluations with interactive clustering using a human supervisor can require a lot of time and effort. Thus, as a substitute, embodiments provide a parameterized supervisor model for the example framework discussed above, based on gold standard cluster labels on data points. The supervisor model was utilized to conduct the example evaluations described further in the appendix.

The challenge is that cluster-level supervision is conditioned on the current set of clusters, which may be different from the true clusters in the gold standard. It can be assumed that the supervisor is able to construct a correspondence between the true clusters T in the gold standard and the current clusters C available at any stage of the interactive process. This correspondence is found using a maximum weighted matching between the true clusters and the current clusters in a bipartite graph, where the edge weight between a true cluster t and a current cluster c is the number of data points from t in c.

As the first supervisor parameter, the supervisor's knowledge about the exact description of a true cluster t is controlled using a parameter $p \in [0, 1]$. When averaging over documents in a true cluster t to construct its description, any specific document is included in the average computation with probability p, so that the user only has partial knowledge of t's description for $p < 1:0$.

The second supervisor parameter is a recognition threshold r for true clusters from computed clusters. For exploratory data mining, the supervisor often becomes aware of clusters existing in the data as they gradually emerge during the clustering process. It can be assumed that the supervisor recognizes a true cluster t from the current cluster c only if c has ambiguity (measured as entropy over true clusters) below threshold r, and if t is the majority true cluster within c. At any stage of the clustering process, the supervisor has a set $T_r \subset T$ of recognized true clusters, and is able map current classes only to these true clusters.

Now, when asked to provide assignment feedback for a data point x given current clusters C and true clusters T, the supervisor first retrieves the true cluster t for x, and then returns the corresponding current cluster. On the other hand, when asked for description feedback on a current cluster $c \in C$, the supervisor first retrieves the corresponding true cluster t, and then returns its inexact description based on his knowledge level p. Note that the supervisor can provide feedback only if the relevant true cluster t belongs in his recognized set of clusters $T_r$.

In the experimental evaluation of example embodiments (described further in the Appendix) using the example clustering process described above, supervisors with different recognition levels, as well as different levels of knowledge, are taken into consideration.

Convergence: An important issue that naturally arises for any interactive data-mining task is that of convergence. While emphasizing that a detailed investigation of supervisor behavior and convergence is beyond the scope of this description, herein is briefly discuss some conditions under which convergence can be guaranteed in the context of the supervisor model.

At a high level, the interactive clustering process converges if and only if the supervisor provides a consistent sequence of feedback. Here a very strict definition of consistency is provided: A sequence of feedback is consistent if all of the following conditions hold. First, the resulting sequence of recognized cluster sets is monotonically non-decreasing, that is, a cluster once recognized by the supervisor cannot be decided as unrecognizable later. Secondly, for two cluster description feedback types $f_i^d \equiv \{o_i^d, p_i^d\}$ and $f_j^d \equiv \{o_j^d, p_j^d\}$ provided at two different stages of the process (for example, CLIKM), if they are provided on the same recognized cluster ($o_i^d = o_j^d$), then the preferred descriptions also are the same ($p_i^d = p_j^d$). Thirdly, for two assignment feedback types $f_i^a \equiv \{x_i^a, \mu_i^a, \mu_j^a\}$ and $f_j^a \equiv \{x_j^a, \mu_j^a, \mu_j^a\}$ provided at different stages, if they are provided for the same data point ($x_i^a = x_j^a$) given the same current set of clusters ($\mu_i^a = \mu_j^a$), then the preferred cluster also has to be the same ($\mu_i^a = \mu_j^a$). Under the above conditions, the interactive process is guaranteed to converge.

It is possible to relax the first two conditions, but note that third is a requirement. Also, the number of iterations to convergence for a consistent feedback sequence depends on multiple factors, such as the rate of growth of the recognized cluster set, and for multiple assignment feedback types on the same data point, the similarity between their set of clusters.

The Appendix provides some example evaluations that demonstrate the effectiveness of embodiments in comparison with conventional clustering processes.

In summary, embodiments provide a novel semi-supervised model for interactive clustering, where the user provides two different types of feedback that align naturally with the update and assignment steps of prototype based clustering. Taking k-means as an example, such feedback can be incorporated within prototype based objective functions as additional constraints to be satisfied. Embodiments thus provide a promising alternative to pair-wise instance-level supervision for high dimensional domains, such as document collections that cannot be easily visualized.

Figure 7:
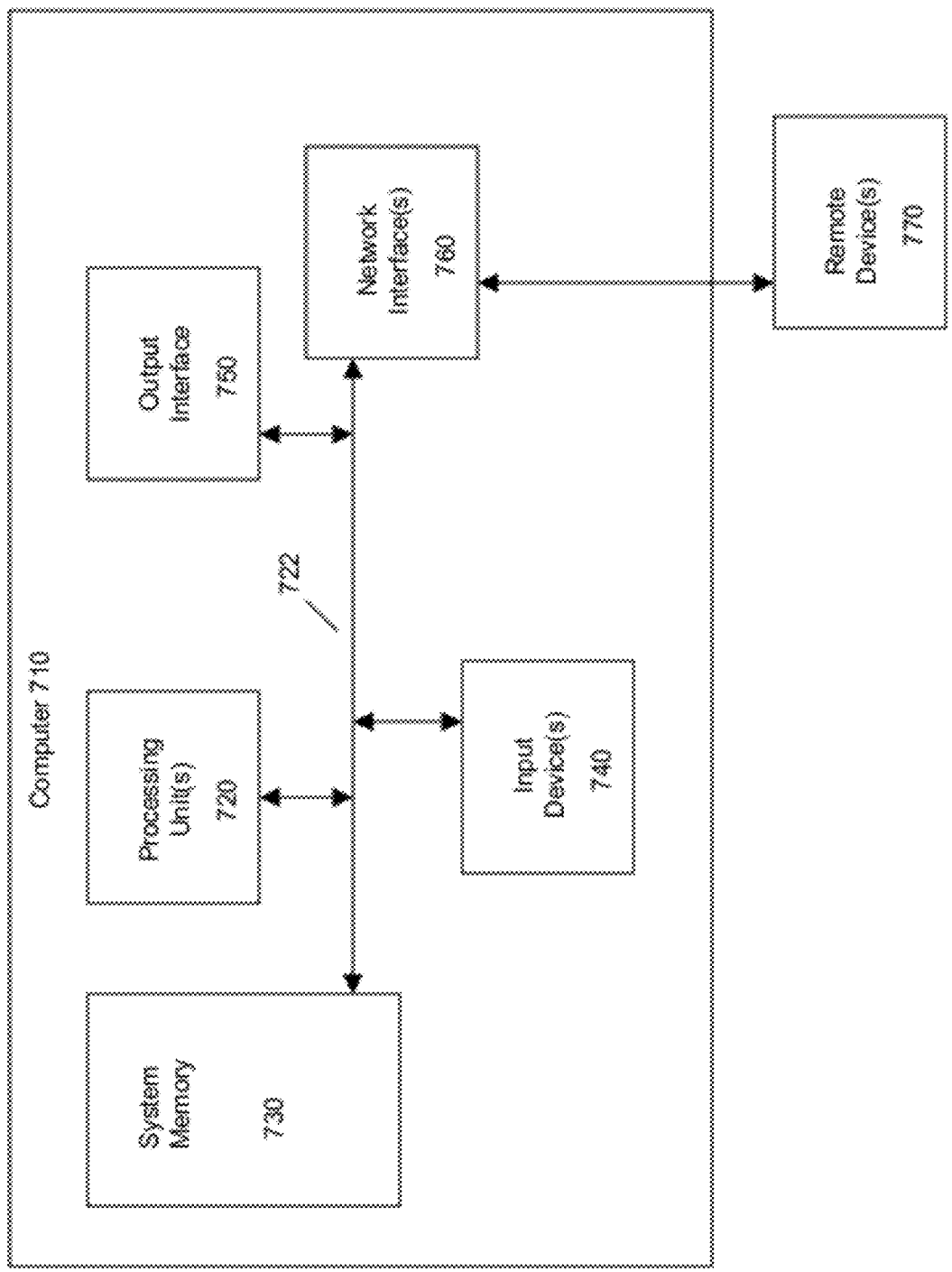
FIG. 7 illustrates an example computer system.

Referring to FIG. 7, it will be readily understood that certain embodiments can be implemented using any of a wide variety of devices or combinations of devices. An example device that may be used in implementing one or more embodiments includes a computing device in the form of a computer 710. In this regard, the computer 710 may execute program instructions configured to perform initial clustering, accept user feedback, perform iterations of clustering, and perform other functionality of the embodiments, as described herein.

Components of computer 710 may include, but are not limited to, a processing unit 720, a system memory 730, and a system bus 722 that couples various system components including the system memory 730 to the processing unit 720. The computer 710 may include or have access to a variety of computer readable media. The system memory 730 may include computer readable storage media in the form of volatile and/or nonvolatile memory such as read only memory (ROM) and/or random access memory (RAM). By way of example, and not limitation, system memory 730 may also include an operating system, application programs, other program modules, and program data.

A user can interface with (for example, enter commands and information) the computer 710 through input devices 740. A monitor or other type of device can also be connected to the system bus 722 via an interface, such as an output interface 750. In addition to a monitor, computers may also include other peripheral output devices. The computer 710 may operate in a networked or distributed environment using logical connections to one or more other remote computers or databases. The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

APPENDIX

Figure 5A:
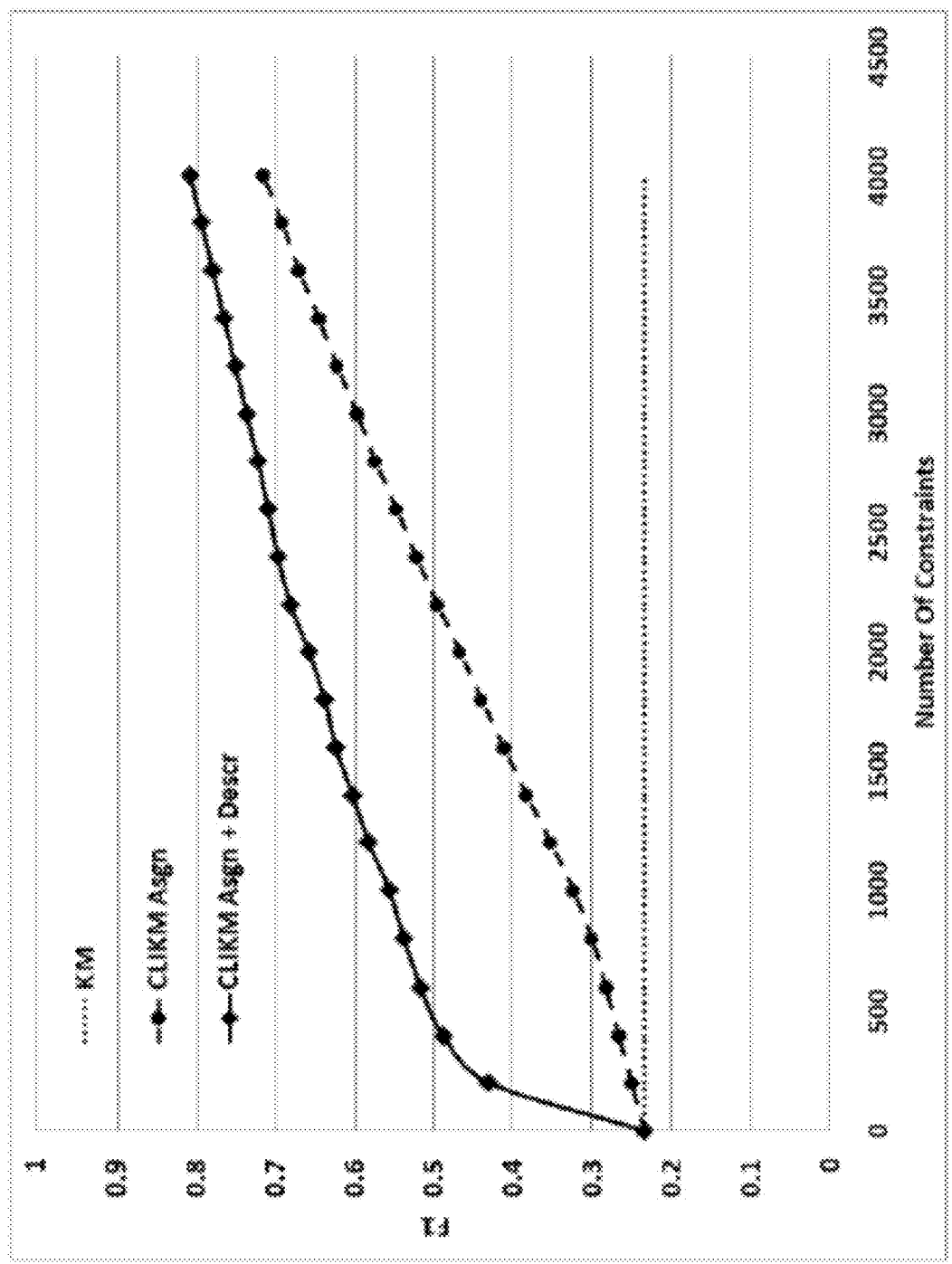
FIG. 5(A-B) illustrates performance evaluation examples for several clustering approaches operating on collections of documents.
Figure 5B:
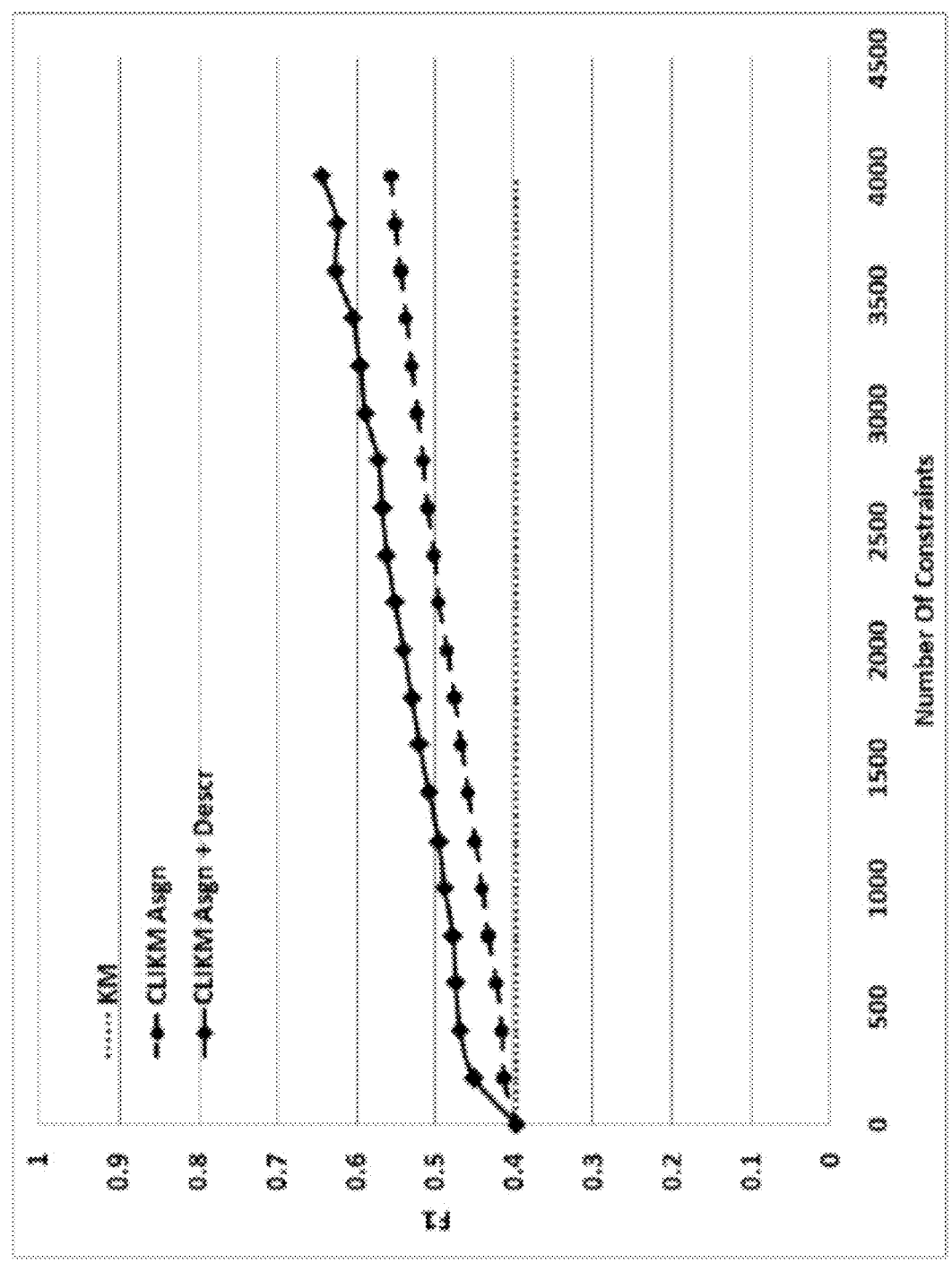
Figure 6:
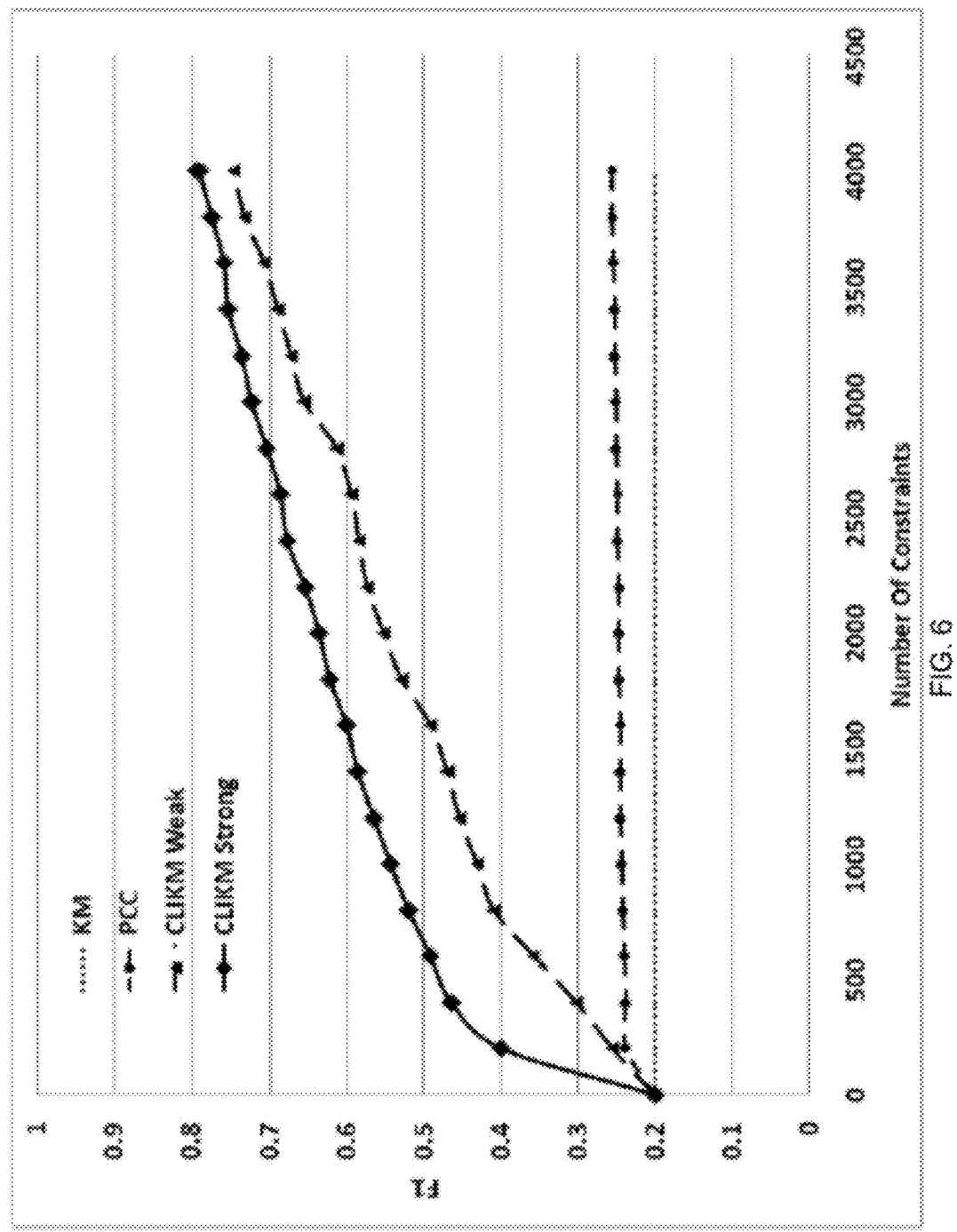
FIG. 6 illustrates performance evaluation examples for several clustering approaches operating on collections of documents.

Now are described some example evaluations to illustrate the effectiveness of the example interactive clustering framework described above, with reference made to FIG. 4(A-D), FIG. 5(A-B) and FIG. 6. Two benchmark real-world text categorization datasets from two different domains were considered. These were "Twenty Newsgroups" and "Reuters-21578". The goal of the example clustering task is to produce clusters that correspond to the gold standard categories. Generally, this is not expected of unsupervised clustering. The datasets, baselines and evaluation metrics are briefly described before discussing evaluation results.

Datasets: A first dataset (8NG) was composed of eight "20 Newsgroup" classes (all of rec.* and sci.*) having 1000 documents each. A second dataset (R10) was composed by selecting the top 10 categories from the "Reuters-21578" corpus, and including all train/test documents, resulting in a collection of 9118 documents. All documents were pre-processed in a standard way (using word stemming, pruning stop-words and infrequent words (occurring less than 5 times in the dataset)). The datasets are available at: http://www.godbole.net/shantanu/work/ecm110iclust.html.

Evaluation Metric: To evaluate a set of clusters against a gold standard, the correctness of clustering decisions over all pairs of data points was checked. The standard F1 measure and Adjusted Rand Index (ARI) over the pairwise clustering decisions is reported. The F1 measure is the harmonic mean of precision and recall over pairwise decisions. The Adjusted Rand Index is defined as $$2(ab-cd)/((a+d)(d+b)(a+c)(c+b))$$

where a is the number of true positive pairs, b is the number of true negative pairs, c is the number of false positive pairs and d is the number of false negative pairs. Using Normalized Mutual Information evaluation yields trends similar to that with F1 and ARI.

Baselines: As the first baseline for the cluster-level interactive k-means process (CLIKM), completely unsupervised k-means (KM) was considered. Also compared was pair-wise constrained clustering with instance-level must-link and cannot-link constraints (PCC). For this comparison, pair-wise constraints were incrementally provided to PCC and cluster-level constraints were provided to CLIKM to compare their performance for the same number of provided constraints. Since PCC infers additional constraints from the provided ones using transitivity of must-link constraints, the actual number of constraints considered by PCC is much larger than the provided number. In contrast, the actual and provided number of constraints is the same for CLIKM. While doing this comparison, it needs to be borne in mind that the nature of the two constraints are quite different from each other. First, since CLIKM constraints are conditioned on the current set of clusters, they cannot be converted to an equivalent set of independent pair-wise constraints over data points. Secondly, the supervisor effort required to provide these two types of constraints will also be quite different, and can be measured using extensive user studies. Keeping in mind these differences, the relative performance of PCC and CLIKM when given an equal (though not necessarily equivalent) number of constraints is described below.

Since all of these processes find local optima, when comparing any two, they are provided with the same initialization. All the reported plots are averaged over 10 runs.

Parameter Settings: As default parameters, observed cluster description length was set to $t=10$, supervisor recognition threshold was set to $r=0.95$ and knowledge level was set top=0.25. The strength of description feedback $\lambda$ is set to be the average cluster size (n/k), so that the importance of the supervisor's feedback is roughly the same as that of the points assigned to the cluster. The number of feedback iterations at each step was set to $n_f=200$ for both CLIKM and PCC. (Trends are similar with $n_f=100$ and 200). For CLIKM, description feedback is provided for all current clusters ($n_d=k$), so that assignment feedback is provided for $n_a=200-k$ random data points. For PCC, must-link or cannot-link feedback is provided for $n_f$ random pairs of data points. Recall that the actual number of constraints considered by PCC is much larger than $n_f$, since PCC infers more constraints using transitivity of must-link constraints.

Evaluation 1—CLIKM vs Baselines: In a first evaluation, CLIKM with point assignment and cluster description feedback, was compared with PCC with pair-wise item-level feedback, and with KM on two datasets. The results are shown in FIG. 4(A-D), which illustrates performance (F1 and ARI) of CLIKM and PPC vs. number of feedback iterations from a user against KM as baseline on 8NG(FIG. 4A, 4C) and R10 (FIG. 4B, 4D), where performance is plotted against the cumulative number feedback iterations provided to PCC and CLIKM. The trends are similar for F1 and ARI as the evaluation measure.

With increasing number of feedback, the performance CLIKM improves significantly over unsupervised KM. Performance improves most sharply at the beginning, so that after a few hundred feedback iterations, F1 increases from 0.22 to 0.4 for 8NG and from 0.4 to 0.47 for R10, and increases steadily, but at a slower rate, after that. This is because the user is able to recognize all true clusters during the very first interaction with the default recognition threshold $r=0.95$. Also observe that performance of CLIKM drops slightly at a couple of places for R10 in FIG. 4 (B,D). This is due to the supervisor's inexact knowledge when providing description feedback (p=0.25).

Interestingly, the rate of performance improvement for CLIKM is significantly higher than PCC for both datasets. One potential reason for this is that the space of constraints is quadratic in the number of data items for PCC. In comparison, CLIKM needs at most a linear number of constraints for each clustering iteration, and the number of iterations is usually a constant. As a result, the user can drive the clustering towards his or her desired state with significantly fewer feedback iterations using CLIKM. In the rest of the evaluations only F1 numbers are reported. All trends are similar with ARI.

Evaluation 2—Ablation Study: In a second evaluation, an ablation study was performed to evaluate the impact of assignment and cluster description feedback separately. The results are shown in FIG. 5(A-B), which illustrates the effect of assignment and cluster description feedback on CLIKM for 8NG (FIG. 5A) and R10 (FIG. 5B). FIG. 5(A-B) clearly shows improvement brought about by cluster description feedback on top of that from assignment feedback. This demonstrates that cluster description feedback enables the user to guide the clustering much faster than when empowered only with assignment feedback.

Evaluation 3—Varying Supervisor Parameters: The success of interactive clustering depends a lot on the user's ability to recognize desired clusters, his or her knowledge about the correct description of these clusters, and the strength of description feedback that he or she sets.

TABLE 1

Clustering performance (F1) after 3000 feedback iterations
for varying user knowledge (p), user confidence (λ) and R10.

|           | λ = n/10k | λ = n/2k | λ = n/k |
|-----------|-----------|----------|---------|
| p = 0.001 | 0.486     | 0.471    | 0.410   |
| p = 0.01  | 0.487     | 0.497    | 0.487   |
| p = 0.10  | 0.489     | 0.502    | 0.522   |
| p = 0.25  | 0.490     | 0.510    | 0.511   |

First, in Table 1, the effect of providing description feedback to CLIKM with different combinations of user knowledge p and strength of description feedback λ, after it has already received 3000 assignment feedback iterations, is recorded. The first trend is that performance improves with supervisor knowledge when λ is fixed, over all 3 columns. Recall that λ=n/k corresponds to equally weighting user's cluster description feedback and the data points currently assigned to a cluster, so that the first two columns correspond to weighting the feedback 10 times and 2 times lower than the data respectively. The rows provide a more interesting insight. For reasonable supervisor knowledge, performance improves with higher λ. However, when supervisor knowledge is weak (first two rows), increasing λ hurts performance. This suggests that when the supervisor is not confident about his knowledge of the clusters, he or she should allow the data to influence the clustering more than supervision.

Finally, the impact of recognition threshold r of the supervisor was explored. In FIG. 6, CLIKM performance with the default strong supervisor (r=0.95) was compared against that with a weak supervisor (r=0.9) for 8NG. For the strong supervisor, performance improves significantly right at the beginning when all the true clusters are recognized and description feedback is provided for them. For the weak supervisor, only 50% of the true clusters are recognized at the first stage, and the rest at various later stages of the inter-active process, as marked by the jumps in performance. The gap between the two curves closes steadily as the inter-active process progresses.

Summary of Evaluations: In summary, the evaluations demonstrate that cluster-level semi-supervision leads to significant and steady improvements in clustering accuracy in comparison with unsupervised k-means. Improvements persist over varying levels of supervisor knowledge and cluster recognition ability. The rate of improvement is several times faster compared to that with an equal number pair-wise instance-level constraints.

What is claimed is:

1. A computer program product for interactive clustering comprising:
a computer readable storage medium having computer readable program code embodied therewith, the computer readable program code comprising:
computer readable program code configured to access a collection of items to be clustered;
computer readable program code configured to cluster the collection of items to be clustered into an initial plurality of clusters;
computer readable program code configured to access user input feedback modifying one or more of cluster assignment of the initial plurality of clusters and cluster description of the initial plurality of clusters; and
computer readable program code configured to re-cluster the collection of items based on the user input feedback; and
wherein the computer readable program code configured to re-cluster the collection of items based on the user input feedback is further configured to iteratively re-cluster responsive to user feedback.

2. The computer program product according to claim 1, wherein the user input feedback includes both cluster assignment feedback and cluster description feedback.

3. The computer program product according to claim 2, wherein the cluster assignment feedback comprises feedback re-assigning one or more clustered objects to a new cluster of the initial plurality of clusters.

4. The computer program product according to claim 2, wherein the cluster description feedback comprises feedback changing a description of one or more clusters of the initial plurality of clusters.

5. The computer program product according to claim 2, wherein the collection of items to be clustered comprises a plurality of documents.

6. The computer program product according to claim 5, wherein the cluster assignment feedback includes one or more indications for re-assigning one or more documents to one or more clusters of the initial plurality of clusters.

7. The computer program product according to claim 5, wherein the cluster description feedback includes one or more changes to one or more descriptive words used to describe one or more clusters of the initial plurality of clusters.

8. The computer program product according to claim 1, wherein to cluster the collection of items to be clustered into an initial plurality of clusters further comprises utilizing k-means clustering.

9. A computer-implemented method for interactive clustering comprising:
accessing a collection of items to be clustered;
clustering the collection of items to be clustered into an initial plurality of clusters;
accessing user input feedback modifying one or more of cluster assignment of the initial plurality of clusters and cluster description of the initial plurality of clusters; and
re-clustering the collection of items based on the user input feedback; and
wherein re-clustering the collection of items based on the user input feedback further comprises iteratively re-clustering responsive to user feedback.

10. The method according to claim 9, wherein the user input feedback includes both cluster assignment feedback and cluster description feedback.

11. The method according to claim 10, wherein the cluster assignment feedback comprises feedback re-assigning one or more clustered objects to a new cluster of the initial plurality of clusters.

12. The method according to claim 10, wherein the cluster description feedback comprises feedback changing a description of one or more clusters of the initial plurality of clusters.

13. The method according to claim 10, wherein the collection of items to be clustered comprises a plurality of documents.

14. The method according to claim 13, wherein the cluster assignment feedback includes one or more indications for re-assigning one or more documents to one or more clusters of the initial plurality of clusters.

15. The method according to claim 13, wherein the cluster description feedback includes one or more changes to one or more descriptive words used to describe one or more clusters of the initial plurality of clusters.

16. The method according to claim 9, wherein clustering the collection of items to be clustered into an initial plurality of clusters further comprises utilizing k-means clustering.

17. A system for interactive clustering comprising:
one or more processors; and
a memory operatively connected to the one or more processors;
wherein, responsive to execution of computer readable program code accessible to the one or more processors, the one or more processors are configured to:
access a collection of items to be clustered;
cluster the collection of items to be clustered into an initial plurality of clusters;
access user input feedback modifying one or more of cluster assignment of the initial plurality of clusters and cluster description of the initial plurality of clusters; and
re-cluster the collection of items based on the user input feedback; and
wherein re-clustering the collection of items based on the user input feedback further comprises iteratively re-clustering responsive to user feedback.

18. The system according to claim 17, wherein:
feedback modifying cluster assignment comprises feedback re-assigning one or more clustered objects to a new cluster of the initial plurality of clusters; and
feedback modifying cluster description comprises feedback changing a description of one or more clusters of the initial plurality of clusters.

\* \* \* \* \*